March 15, 1927.
P. D. BLACKDEN
1,620,865
GRAIN CLEANING AND GRADING MACHINERY
Filed March 2, 1923     3 Sheets-Sheet 2
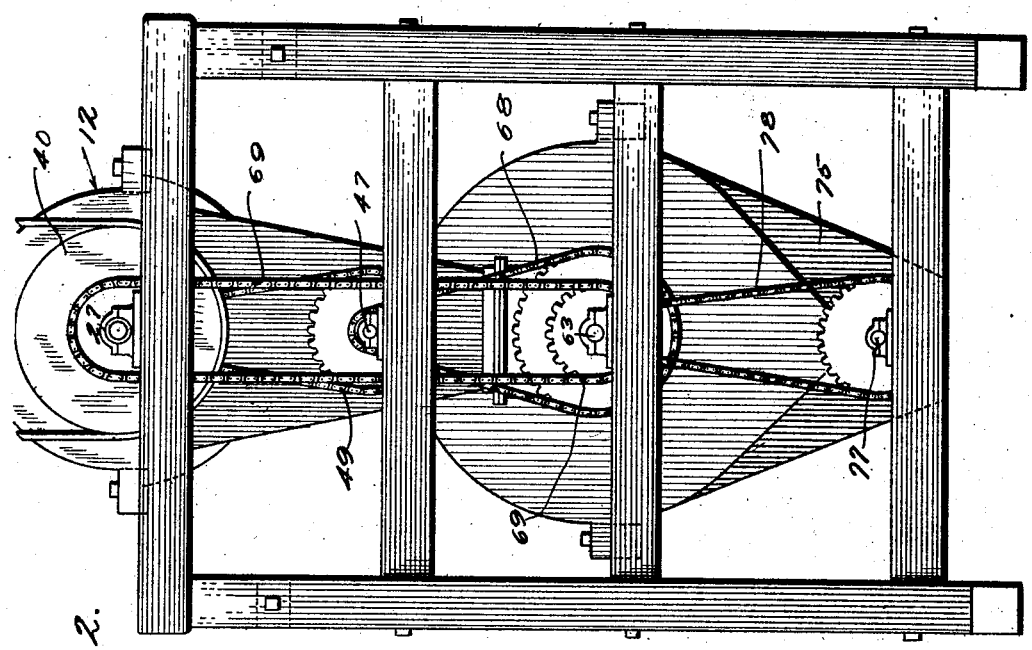
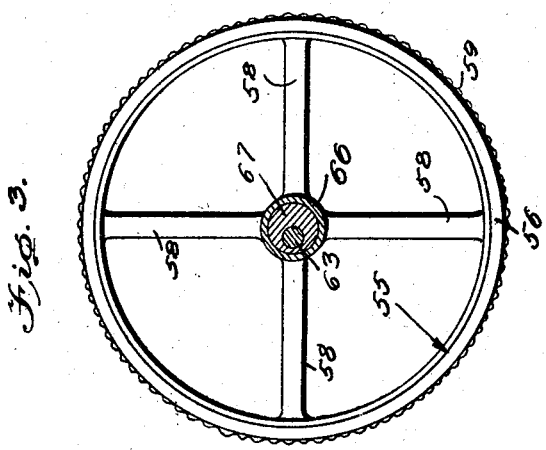
WITNESSES
INVENTOR
P. D. Blackden,
BY
ATTORNEYS March 15, 1927.
P. D. BLACKDEN
1,620,865
GRAIN CLEANING AND GRADING MACHINERY
Filed March 2, 1923  3 Sheets-Sheet 3
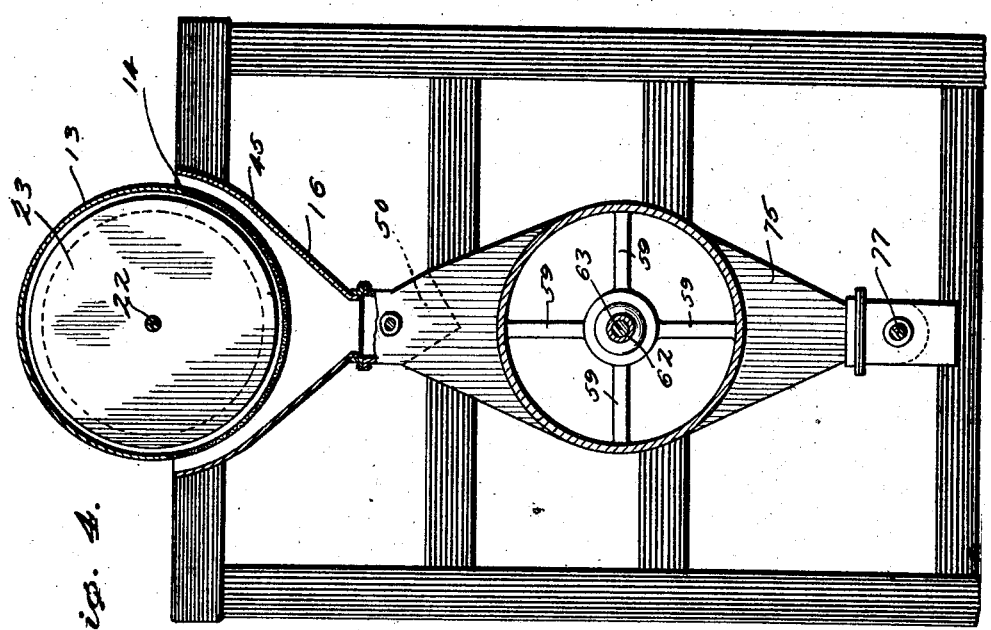
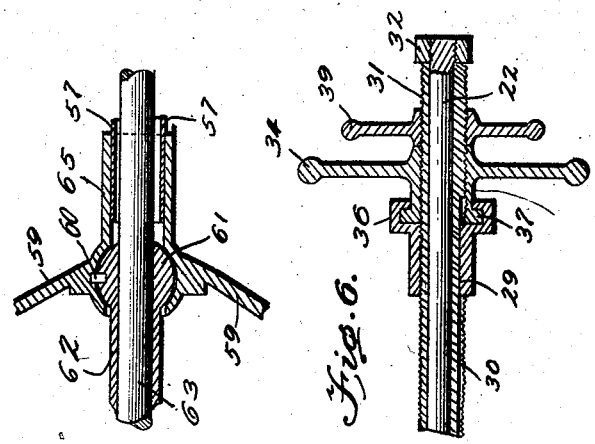
WITNESSES
INVENTOR
P.D. Blackden,
BY
ATTORNEYS Patented Mar. 15, 1927.

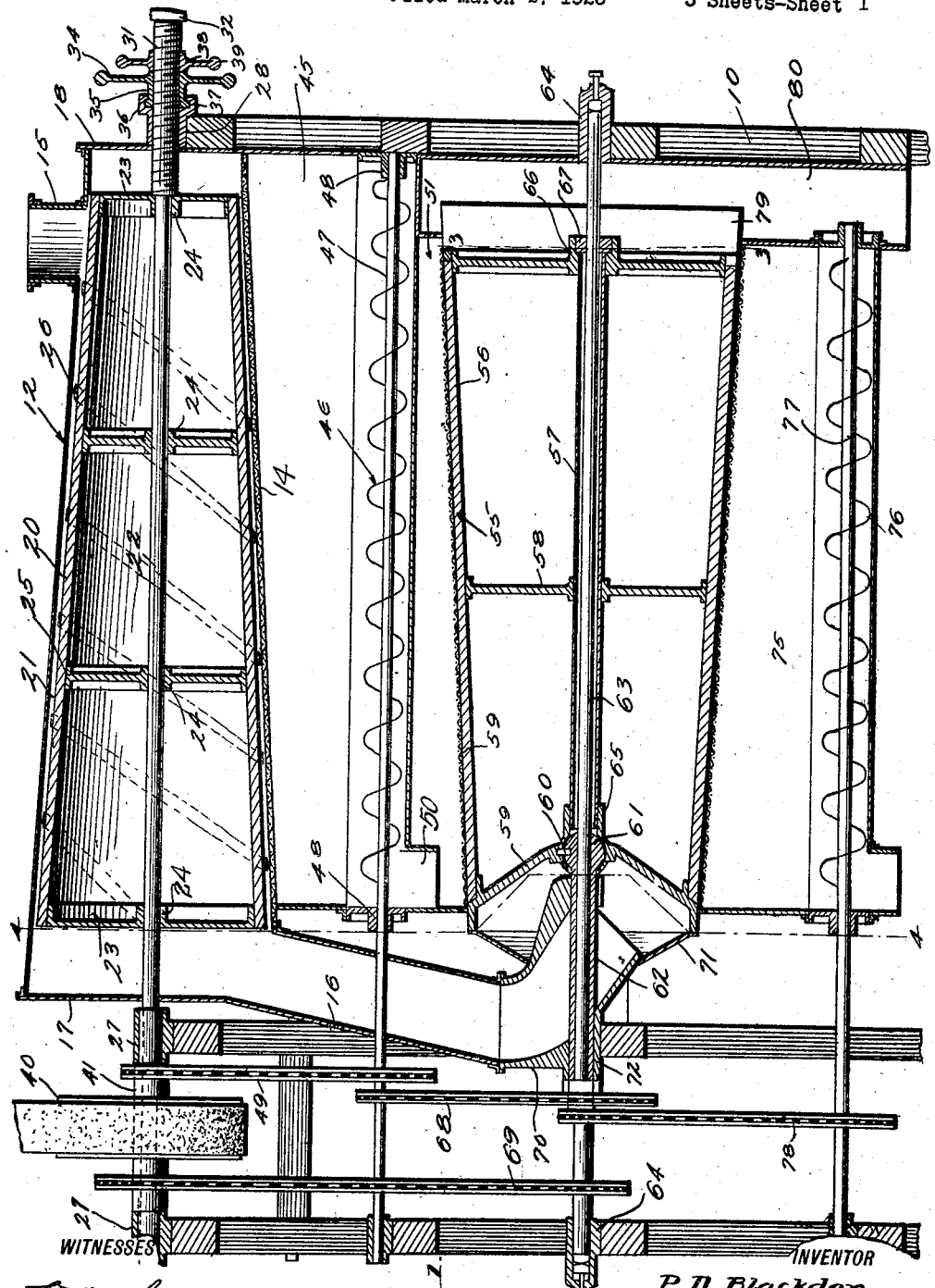

1,620,865

UNITED STATES PATENT OFFICE.

PERRY D. BLACKDEN, OF SACRAMENTO, CALIFORNIA, ASSIGNOR OF ONE-HALF TO ORA A. MORSE, OF SACRAMENTO, CALIFORNIA.

GRAIN CLEANING AND GRADING MACHINERY.

Application filed March 2, 1923. Serial No. 622,390.

The present invention relates to grain cleaning and grading machinery especially designed to remove water, grass seed and other foul seeds from paddy rice.

The object of the invention is to provide a machine of this character which completely and efficiently removes the undesirable seed or the like from the grain and which for this purpose is invariable in its action and which is in general simple and durable in construction, reliable and efficient in operation and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a view in longitudinal vertical section of the preferred embodiment of the invention;

Figure 2 is an end elevational view thereof;

Figure 3 is a view in transverse vertical section taken on line 3—3 of Figure 1;

Figure 4 is a similar view on line 4—4 of Figure 1;

Figure 5 is a detail view, partly in section and partly in elevation, of the universal mounting for one end of the revolving screen; and Figure 6 is a detail view in section of the adjusting mechanism for the revolving drum.

Referring to the drawings wherein for the sake of illustration is shown the preferred embodiment of the invention, the numeral 10 designates a frame of suitable construction to support the elements of the machine.

A chamber, designated generally at 12 is carried by the frame and is arranged at the upper end thereof. The chamber is of conical form and the upper section, approximately the upper half thereof, preferably consists of an imperforate metal casing 13, the lower half or section of the chamber consisting of a screen 14. The screen 14 may comprise a sheet of perforated steel suitably formed but it may consist of a plurality of grid bars or similar members assembled to constitute the screen. An inlet 15 is connected with the upper section 13 of the chamber 12 to provide for the inlet of the grain to be cleaned and the lower section is provided at the opposite end of the chamber with an outlet 16, the ends of the chamber being closed by plates 17 and 18.

A revolving drum 20 which may be constructed of wood or metal is operatively arranged within the chamber 12. The drum is of frusto-conical form and is slightly smaller than the chamber 12 to define with the chamber a space or clearance 21. A shaft 22 carries the drum by means of disks 23 having hubs 24 fixed to the shaft and rims 25 fixed to the inner side of the drum, one of such disks being arranged at each end of the drum and two of such disks being arranged intermediate the ends of the drum, as clearly shown in Figure 1. The drum 20 carries spiral flights or ribs 26 serving to advance the grain through the chamber from the small end to the large end of the drum. At one end the shaft 22 is journaled in bearings 27 mounted on the frame and at the opposite end of the shaft a bearing 28 is provided. A key 29 is fixed to the lower side of the interior wall of the bearing 28 and is slidably received in a key-way 30 formed in a sleeve 31. The interior wall of the sleeve 31 is smooth and receives and engages one end of the shaft 22 thus constituting a journal for this end of the shaft. The shaft 22 is freely rotatable with respect to the sleeve 31 but is constrained to partake of the longitudinal movement of the sleeve and for this purpose one end of the sleeve abuts the adjacent disk 23 and the other end of the sleeve abuts a collar 32 fixed to the shaft. A hand wheel 34 is arranged on the sleeve 31 and includes a hub 35 having an annular flange 37 rotatably received in an annular recess 36 formed in an enlarged portion of the bearing 28. The exterior of the sleeve 31 and the interior of the hub of the hand wheel are correspondingly threaded whereby the sleeve 31 constitutes a screw and the hand wheel constitutes a rotatable nut having a threaded bearing cooperable with the screw to impart longitudinal movement thereto. A lock nut 38 is also engaged with the sleeve 31 and when turned to abut the hand wheel 34 serves to lock the screw in adjusted position, the lock nut 38 being provided with a flanged rim 39 to facilitate adjustment thereof. It is obvious that when the lock nut is disengaged from the hand wheel, the hand wheel may be turned to impart longitudinal movement to the sleeve screw 31 which being fixed to the shaft 22 with respect to longitudinal movement imparts a corresponding longitudinal movement to the shaft 22 and consequently to the revolving drum since the revolving drum is fixed to the shaft. In this manner the clearance or space between the drum and its chamber may be varied to suit conditions.

The shaft 22 is driven at a relatively high rate of speed preferably at approximately 300 R. P. M. by means of a pulley 40 having a hollow shaft 41 fixed to its hub and splined to the shaft 22 to impart the rotary movement of the pulley to the shaft while permitting the shaft to move longitudinally as above described.

A trough 45 preferably in the form of a hopper extends around the perforated portion of the chamber 12 and receives the discharge from this perforated section, the lower constricted or narrowed end of the trough or hopper having a screw conveyor 46 operating therein, the screw conveyor including a shaft 47 journaled in bearings 48 and driven at a speed of approximately 100 R. P. M. from the hollow shaft 41 by means of chain and sprocket gearing 49. The screw conveyor 46 carries the materials received in the hopper to an outlet 50 which delivers these materials into the revolving screen chamber, designated at 51.

A revolving screen, designated generally at 55, is arranged in the revolving screen chamber and comprises a frame 56 mounted on an elongated sleeve 57 by means of spiders 58, the frame 56 consisting of longitudinal ribs serving to carry a screen or reticulated fabric 59.

A spider at the small end of the revolving screen has inclined arms 59', and has its hub formed with a socket to receive a ball 61 which is connected to the socket by means of a key 60 to form a universal coupling. Ball 61 is formed integral with hollow shaft 62 rotatably mounted on a shaft 63 journaled in bearings 64 carried by the frame 10. The hub is also provided with a flange 65 which is connected with one end of the sleeve 57. At the opposite end of the drum the hub of the spider 50 has an eccentric strap 66 formed thereon and cooperating with an eccentric 67 fixed to the shaft 63. The hollow shaft 62 serves to impart rotary motion to the revolving screen by means of the universal coupling above described, while the shaft 63 serves to impart agitating or jogging motion to the screen by means of the eccentric 67, the universal coupling between the hollow shaft 62 and the revolving screen permitting this jogging while at the same time transmitting the requisite rotary motion to the screen. The screen is revolved at the rate of approximately 25 R. P. M. from the conveyor shaft 47 by means of sprocket gearing 68 and the shaft 63 which agitates the screen is revolved at the rate of approximately 300 R. P. M. by means of sprocket gearing 69 which derives its motion from the hollow shaft 41 carried from the pulley 40.

The outlet 16 from the chamber 12 connects with one end of an elbow 70, the other end of which leads into the interior of the revolving screen, a cap plate 71 being carried by the elbow and abutting the end of the revolving screen to confine the grain delivered to the screen to the interior thereof. It is to be noted that the elbow 70 which is itself a heavy casting and carried by the frame is provided with bearings 72 which rotatably support the hollow shaft 62 hereinabove referred to.

A hopper or trough 75 is arranged below the screen compartment 51 and in the lower end of the screen compartment a conveyor operates, being driven from the conveyor shaft 77 at approximately 100 R. P. M. by means of sprocket gearing 78 which takes its motion from the shaft 63. The interior of the revolving screen delivers the grain by means of a frusto conical deflector 79 to a grain conduit 80 which leads off from the machine.

In operation, the grain is fed through the inlet 15 into the chamber 12 where it encounters the rapidly revolving drum 20 which drags it across the screen or grid formed by the lower section of the chamber 12 removing the beards and hulls and forcing the seeds through the grid or screen into the trough 45. The grain is advanced from the small end of the frusto conical drum to the large end by means of the spiral flights carried by the periphery of the drum and during its entire longitudinal travel it is subjected to the combined action of the revolving drum and grid. The grain with the seeds and beards and hulls removed is then discharged into the outlet 16 from whence it is delivered from the elbow 70 into the interior of the revolving screen 55, the hulls and beards and the seed being delivered into the screen compartment but exteriorly of the screen by means of the outlet 50 of the trough or hopper 45. The grain within the revolving screen is subjected to a further cleaning action by virtue of the revolving and jogging of the screen accomplished by the hollow shaft 62 and its universal coupling and by the shaft 63 and its eccentric, respectively. By this action the grain is further and completely cleaned and all of the grass seeds or the like are removed therefrom, the cleaned grain being delivered to the outlet conduit 80 and the hulls and grass seeds being delivered to the trough or hopper 75 from which they are carried off by means of the screw conveyor 76.

I claim:

1. In a machine of the character described, a revolving screen comprising an elongated sleeve, a frame, spiders connecting said frame and said sleeve, means for rotating said screen including a hollow shaft and a universal coupling connecting said hollow shaft and one of the spiders of said screen, and means for jogging said screen including a shaft, an eccentric fixed to said shaft and an eccentric strap carried by another of said spiders and cooperating with said eccentric.

2. In a machine of the character described, a revolving screen and means for rotating said screen including a hollow shaft and a universal coupling connecting said hollow shaft with one end of said revolving screen, and means for imparting a jogging motion to said screen including a shaft extending through said hollow shaft and carrying an eccentric, said screen having an eccentric strap cooperating with said eccentric.

3. In a machine of the character described, a revolving screen, a sleeve, a universal coupling connecting said sleeve with one end of said revolving screen, a shaft extending through said sleeve, an eccentric carried by said shaft, an eccentric strap carried by said screen, and adapted to cooperate with said eccentric, and means for rotating said screen and shaft at different speeds, whereby the screen is rotated while being agitated by means of the eccentric.

4. A device of the class described comprising a revolving screen, a universal coupling connected to one end of said screen, a hollow shaft for rotating said coupling and said screen, a second shaft extending longitudinally through said screen, and eccentric means mounted on said shaft and adapted to gyrate the other end of said screen.

5. A device of the class described comprising a revolving screen, a universal coupling connected to said screen, a hollow shaft connected to said coupling to rotate the coupling and screen, a second shaft extending longitudinally through said screen, an eccentric on said second shaft and a cooperating eccentric strap mounted on said screen.

PERRY D. BLACKDEN